United States Patent [19]

Yamada et al.

[11] Patent Number: 4,855,848
[45] Date of Patent: Aug. 8, 1989

[54] DOUBLE INSERTION AND INNER LID FLOAT PREVENTING MECHANISM

[75] Inventors: Kimichika Yamada; Yukio Ito; Hiroyuki Ohkawa, all of Tokyo, Japan

[73] Assignee: Clarion Co., Ltd., Tokyo, Japan

[21] Appl. No.: 100,281

[22] Filed: Sep. 23, 1987

[30] Foreign Application Priority Data

Sep. 30, 1986 [JP] Japan .................................. 61-232211

[51] Int. Cl.⁴ .......................................... G11B 15/675
[52] U.S. Cl. ................................................. 360/96.5
[58] Field of Search ............................. 360/96.5, 96.6

[56] References Cited

U.S. PATENT DOCUMENTS 4,631,607 12/1986 Katsumata ........................ 360/96.5
4,680,654 7/1987 Shibuya ............................ 360/96.5

Primary Examiner—Robert S. Tupper
Attorney, Agent, or Firm—Flynn, Thiel, Boutell & Tanis

[57] ABSTRACT

A tape recorder for a cassette having an inner lid includes a misplate pivotably engaging a connection plate bridging right and left side plates. The misplate is pivotable within a limited angle to overhang a space defined by the side plates and the connection plate in order to reject double cassette insertion and prevent floating motion of the inner lid at a predetermined mode position.

4 Claims, 4 Drawing Sheets

4,855,848

DOUBLE INSERTION AND INNER LID FLOAT PREVENTING MECHANISM

FIELD OF THE INVENTION

This invention relates to a mechanism for preventing double cassette insertion and floating motion of an inner lid in a magnetic recording apparatus for an 8mm video or other cassette including an inner lid.

BACKGROUND OF THE INVENTION

In recent years, a great development or practical use is appreciated in the field of 8mm video, digital audio tape players or other magnetic recording apparatuses including a rotary head to effect digital recording.

Such a magnetic recording apparatus gives more reliable and improved image and sound quality than a prior art apparatus using a fixed head. However, the use of a rotary head requires a mechanism for driving the rotary head, a tape loading mechanism for winding a tape on the rotary head and other related mechanisms. This invites an increase in the number of parts and in the mounting space of the apparatus. Therefore, a dimensional decrease and a structural simplification are strong demands in the field of these magnetic recording apparatuses.

In a magnetic recording apparatus of this type, cassette insertion and ejection are effected by moving right and left cassette holders along guide grooves of right and left side plates in a space defined by the vertically standing side plates and a horizontal connection plate connecting the side plates.

In this arrangement, a cassette loaded in a mode position cannot be seen from the exterior of the apparatus. Therefore, it sometimes occurs that another cassette is inserted erroneously in addition to the former cassette already head in the interior of the apparatus. This often causes the latter cassette to hit opposed interior walls of the apparatus or causes the tape to be pulled out of the cassette. In order to prevent this trouble, a prior art apparatus is provided with a double insertion preventing mechanism comprising a particular stoppers which cover the surface of a loaded cassette to prevent insertion of a second cassette.

However, the use of the particular stoppers increases the number of parts and complicates the construction of the apparatus. Additionally, the particular stoppers are usually mounted on the cassette holders pivotably in response to a movement thereof, considering their function, and the particlar stoppers reach high when the cassette holders are elevated. This obviously causes a dimensional increase of the apparatus.

Further, an 8 mm video cassette includes an inner lid, the inner lid which often hits a dust door at a cassette insertion/ejection aperture if the inner lid stands high upon ejection of the cassette, and prevents smooth ejection of the cassette.

OBJECT OF THE INVENTION

It is therefore an object of the invention to provide a double insertion and inner lid float preventing mechanism which not only covers the surface of a cassette held in the interior of the apparatus to prevent double cassette insertion but also urges an inner lid upon ejection of the cassette to prevent the inner lid from floating up and further contributes to a dimensional reduction and a simplified construction of the apparatus.

SUMMARY OF THE INVENTION

A double insertion and inner lid float preventing mechanism according to the invention includes a misplate overhanging a space defined by right and left side plates and a connection plate. The misplate has one end insertingly engaging the connection plate to move pivotably up and down about the engagement point to push an inserted cassette downwardly. The same end of the misplate is also provided with vertical extensions which serve as regulating means for connection plate to limit a downward pivotal movement of the misplate. An upward movement of the misplate is limited by claw members formed on the right and left side plates.

With this arrangement, when a cassette is inserted, the misplate is pivoted vertically to overhang low the surface of the cassette to prevent double insertion. Upon cassette ejection, the misplate presses down the cassette to prevent a flating motion of the inner lid. Further, since the invention employs a very simple arrangement in which the misplate is added to the right and left side plates and the connection plate, and since pivotal movement of the misplate is limited within an angle, the invention contributes to a scale reduction and simplification of the entire apparatus, never inviting a problem that the misplate occupies a large vertical space above the cassette holders when they are elevated.

BRIEF DESCRIPTION OF THE DRAWINGS

FIGS. 2 through 4 are side elevations of the same embodiment: in which FIG. 2 shows that a cassette is inserted; FIG. 3 shows that a cassette is going to be loaded; and FIG. 4 shws that a cassette loading operation is completed.

DETAILED DESCRIPTION

Figure 1:
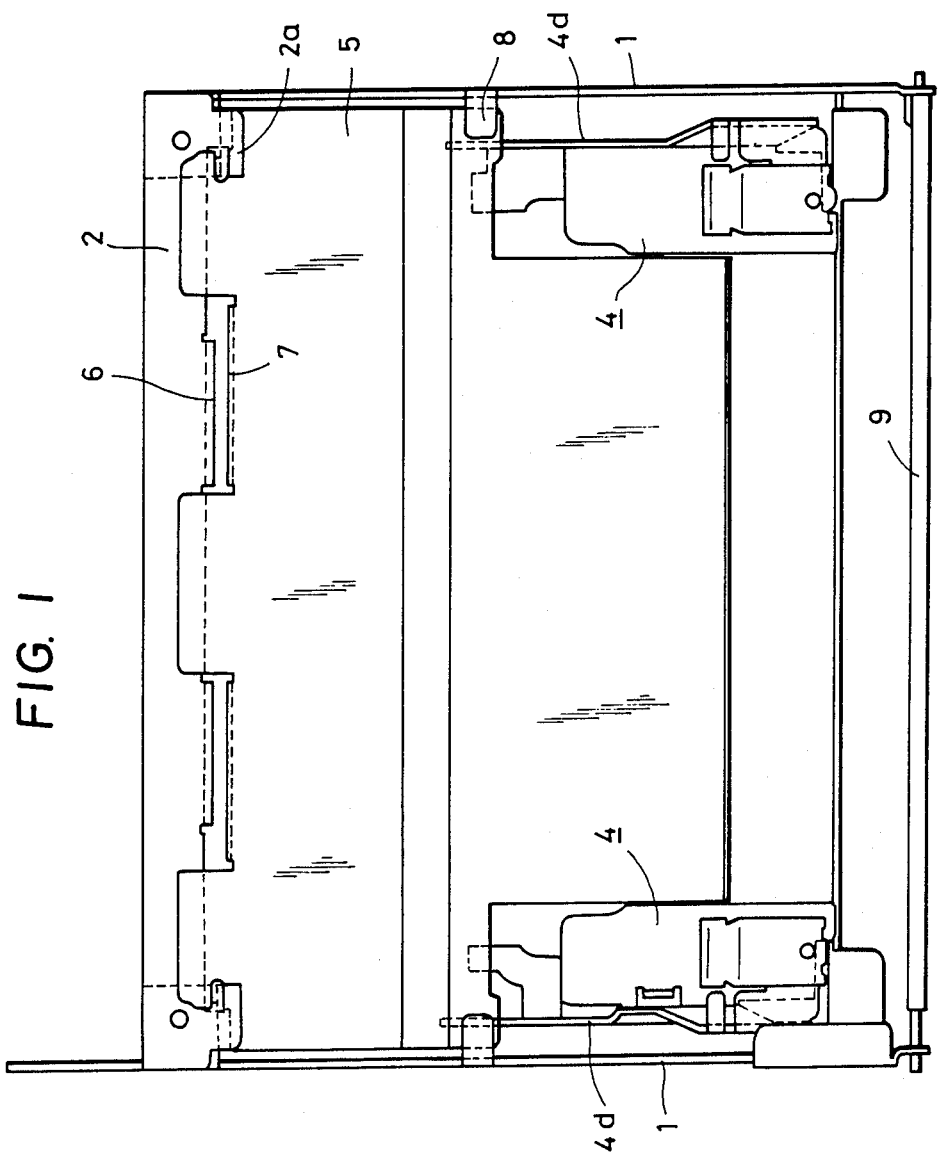
FIG. 1 is a plan view showing an embodiment of a double insertion and inner lid float preventing mechanism according to the invention.

A double insertion and inner lid float preventing mechanism according to the invention is described below in detail, referring to an embodiment illustrated in the drawings.

Figure 2:
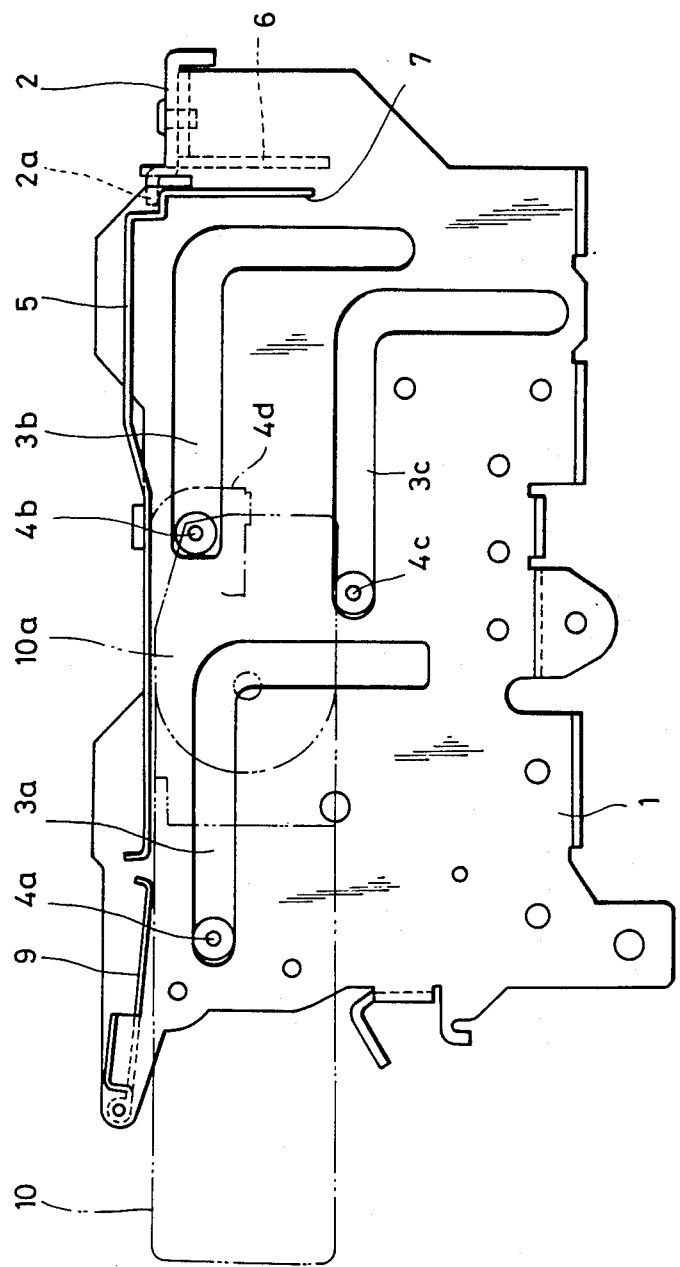

In FIG. 1, there are provided right and left side plates 1 which have rear ends connected to each other by a connection plate 2. Each side plate 1 is provided with guide grooves 3a through 3c at three positions as shown in FIG. 2 to guide reciprocal movements of associated one of right and left cassette holders 4 therealong in horizontal and vertical directions. In FIG. 2, reference numbers 4a through 4c denote guide pins formed on the cassette holders 4 to move in the guide grooves 3a through 3c.

The right and left side plates 1 and the connection plate 2 defines a space which is covered by a misplate 5 which has a rear end engagingly inserted under step portions 2a of the connection plate 2 to support the misplate 5 pivotably up and down about the junction. The misplate 5 is guided by upper portions of vertical plates 4d of the cassette margins 4 to pivot up and down in response to up and down movements of the cassette holders 4.

The construction plate 2 and the misplate 5 are provided with vertical extensions 6 and 7, respectively, which serve as regulating members. When the vertical extensions 6 and 7 engage with each other, a further downward movement of the misplate 5 is prohibited.

At a central portion of each side plate 1 is provided claw members 8 which engage the misplate 5 to limit the upward movement of same.

Reference numeral 9 in the illustration denotes a dust door which covers a cassette insertion apparture, and 10 designates a cassette which includes a lid 10a and an inner lid 10b opened by a lid opener (not shown).

With this arrangement, the embodiment operates as follows.

Upon cassette insertion, the cassette holders 4 take elevated positions at a front area (left-hand area in the drawing) as shown in FIG. 2. Therefore, the misplate 5 is held at a higher position than an insertion path for the cassette 10, and permits that the cassette 10, when manually inserted, is handed to a cassette loading operation of a loading mechanism.

Figure 3:
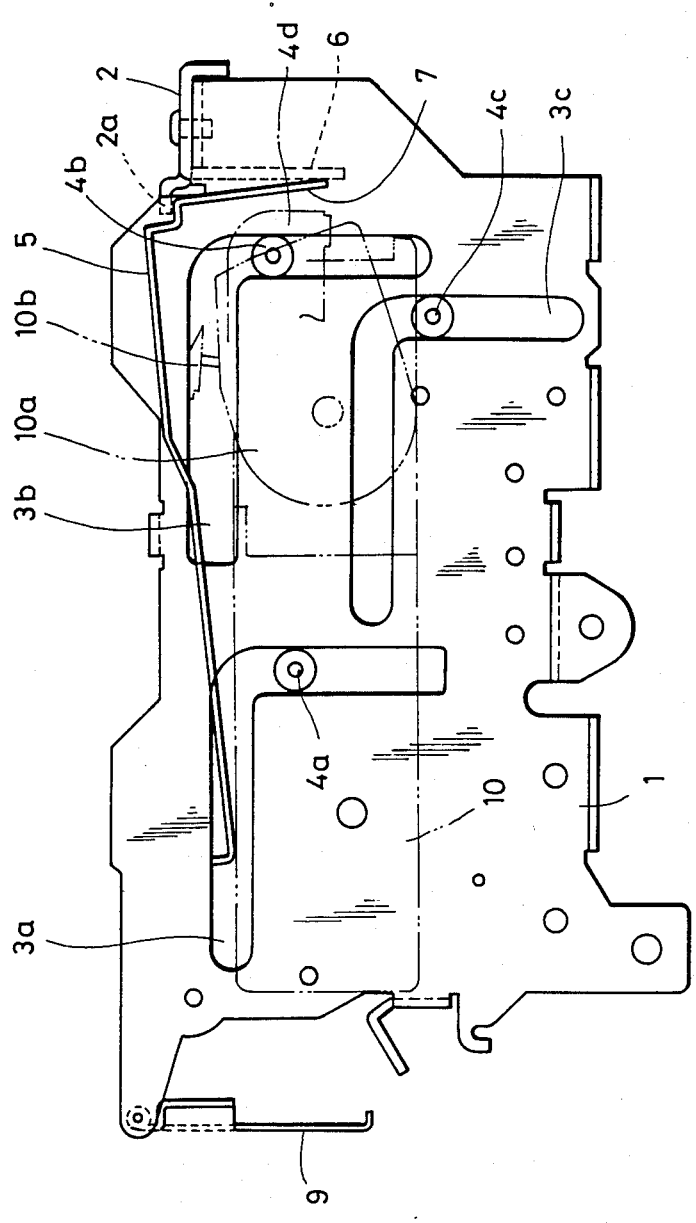

When the cassette holders 4 reach the innerlimit positions (right-hand positions in the drawing), the misplate 5 begins to drop as shown in FIG. 3. In this case, since the connection plate 2 and the misplate 5 have the vertical extensions 6 and 7, respectively, they engage with each other, and the misplate 5 is held at a position to substantially cross the cassette insertion path.

When the cassette holders 4 move down, a lid opener (not shown) is activated to open the lid 10a and the inner lid 10b of the cassette 10.

Finally, when the cassette holders 4 carrying the cassette 10 thereon drop to tape mode positions, i.e. when a cassette loading operation is completed, the lid 10a of the cassette 10 is fully opened for a subsequent tape loading operation.

In this fashion, the embodiment is configured so that the misplate 5 lockingly held in a configuration crossing the cassette insertion path after the cassette loading operation is completed. Therefore, if a user erroneously tries to insert another cassette, the front end of the misplate 5 rejects it and reliably prevents double cassette insertion.

Figure 4:
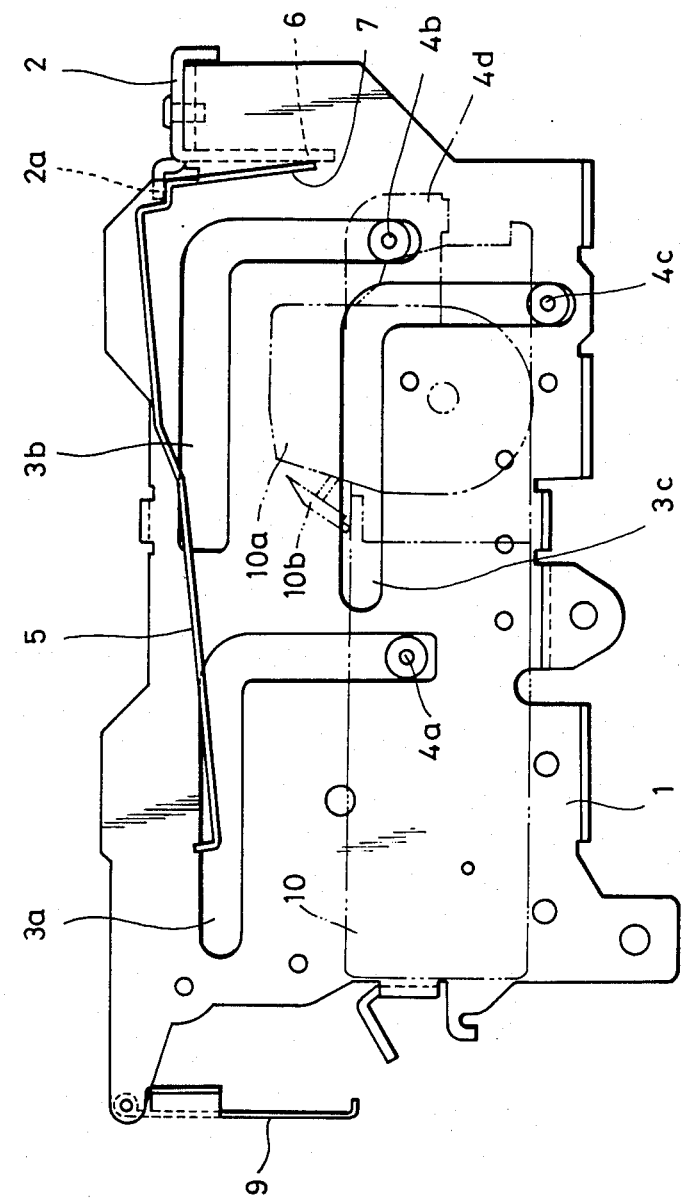

Upon ejection of the cassette 10, an ejection mechanism (not shown) elevates the cassette holders 4 from their cassette loading completion positions of FIG. 4 and move them back forwardly. Responsively, the lid 10a and the inner lid 10b of the cassette 10 are released from the lid opener and return to their closed conditions. In this case, if the lid 10a or inner lid 10b is caught by something in the apparatus or floats up due to some impulse, the ejecting operation is continued while the lid 10a or inner lid 10b is open, i.e. while it takes the configuration of FIG. 3. Since the prior art apparatus does not include any means of pressing the lid 10a and the inner lid 10b, there is a large possibility that the inner lid 10b hits and engages the dust door 9 and prevents ejection of the cassette 10. In contrast, the embodiment uses the misplate 5 to press down the cassette 10, downwardly by the misplate 5 which reliably closes the lid 10a and the inner lid 10b. Therefore, they never hit or engage the dust door 9, and ensure smooth ejection of the cassette 10.

Further, since the embodiment employs a very simple arrangement, i.e. the insertingly engaging misplate is simply added to the minimum arrangement of right and left side plates 1—1 and the connection plate 2, and since the misplate 5 is limited in its pivotal movement, the described arrangement does not cause a problem that the misplate 5 projects upon elevation of the cassette holders, and contributes to a scale reduction and simplification of the entire apparatus. This also simplifies the assembling process of the apparatus.

The invention should not be construed to be limited to the aforegoing embodiment. The configuration and engaging arrangement of the misplate may be changed as desired, and the misplate may be driven by a member other than the cassette holders.

As described above, using a simple arrangement in which the vertically pivotable misplate insertingly engages the connection plate, the invention not only prevents double insertion by covering the surface of a cassette upon cassette loading operation but also prevents floating motion of the inner lid by pressing down the inner lid upon cassette ejection. Also, the double insertion and inner lid float preventing mechanism according to the invention contributes to a scale reduction and simplification of the apparatus.

What is claimed is:

1. A magnetic recording and reproducing apparatus comprising:
   a pair of spaced side plates;
   a connection plate connecting said side plates;
   a cassette holder configured to move along said side plates to an inner position in said apparatus while holding an inserted cassette, to the drop to a predetermined mode position to position said cassette there, and to eject said cassette by moving along an opposite course away from said mode position;
   a misplate supported at one end for pivotal movement and having a portion overhanging a space defined by said side plates and said connection plate, and means for effecting downward and upward pivotal movement of said misplate respectively in response to downward and upward movement of said cassette holder between said inner and mode positions thereof;
   first regulating means for limiting downward pivotal movement of said misplate to a position to prevent insertion of a cassette into said apparatus; and
   second regulating means for limiting downward pivotal movement of said misplate to a position to prevent insertion of a cassette into said apparatus; and
   second regulating means for limiting upward pivotal movement of said misplate to a position to allow insertion of a cassette into said cassette holder;
   wherein said misplate has said one end insertingly engaging said connection plate to effect said pivotal support of said misplate thereon.

2. A magnetic recording and reproducing apparatus comprising:
   a pair of spaced side plates;
   a connection plate connecting said side plates;
   a cassette holder configured to move along said side plates to an inner position in said apparatus while holding an inserted cassette, to then drop to a predetermined mode position to position said cassette there, and to eject said cassette by moving along an opposite course away from said mode position;
   a misplate supported at one end for pivotal movement and having a portion overhanging a space defined by said side plates and said connection plate, and means for effecting downward and upward pivotal movement of said misplate respectively in response to downward and upward movement of said cassette holder between said inner and mode positions thereof;
   first regulating means for limiting downward pivotal movement of said misplate to a position to prevent insertion of a cassette into said apparatus; and second regulating means for limiting upward pivotal movement of said misplate to a position to allow insertion of a cassette into said cassette holder;

wherein said first regulating means includes a vertical extension of said misplate and a vertical extension of said connection plate, said vertical extensions engaging each other upon downward pivotal movement of said misplate.

3. An apparatus of claim 2, wherein said second regulating means includes claw members formed on said side plates and engageable with said misplate.

4. A magnetic recording and reproducing apparatus comprising:

a pair of spaced side plates;

a connection plate connecting said side plates;

a cassette holder configured to move along said side plates from an eject position to an inner position in said apparatus while holding an inserted cassette, to then drop to a predetermined mode position to position said cassette there, and to eject said cassette by moving along an opposite course away from said mode position;

a misplate supported at one end on said connection plate for pivotal movement and having a portion overhanging a space defined by said side plates and said connection plate, and means for effecting downward and upward pivotal movement of said misplate respectively in response to downward and upward movement of said cassette holder between said inner and mode positions thereof;

first regulating means for limiting downward pivotal movement of said misplate to a position to prevent insertion of a cassette into said apparatus; and second regulating means for limiting upward pivotal movement of said misplate to a position to allow insertion of a cassette into said cassette holder, said misplate having means for engaging and moving a movable lid of the cassette from an open position of a closed position during movement of said cassette holder from said mode position to said eject position when the cassette therein is being ejected.

* * * * *

UNITED STATES PATENT AND TRADEMARK OFFICE
CERTIFICATE OF CORRECTION

PATENT NO. : 4 855 848

DATED : August 8, 1989

INVENTOR(S) : Kimichika YAMADA et al

It is certified that error appears in the above-identified patent and that said Letters Patent is hereby corrected as shown below:

Column 6, line 18; change "of" (second occurrence) to ---to---.

Signed and Sealed this

Twenty-first Day of August, 1990

Attest:

HARRY F. MANBECK, JR.

*Attesting Officer*  *Commissioner of Patents and Trademarks*